Patented July 2, 1940

2,206,636

UNITED STATES PATENT OFFICE 2,206,636

PHONOGRAPH RECORD

James H. Hunter, Lansdowne, Pa., assignor to Radio Corporation of America, a corporation of Delaware No Drawing. Application February 27, 1937, Serial No. 128,074

13 Claims. (Cl. 106—1.5)

This invention relates to phonograph records, and more particularly to a composition of matter especially fit for use in the manufacture of such records.

As is well known in the resin record industry, commercial phonograph records are pressed from the resins, either natural or synthetic, while they are in plastic form, and various fillers are incorporated therein in order to control the consistency thereof and to impart wear resistance to the records. Among the fillers most commonly employed are slate, various clays, metal oxides and silicates, etc., all of which must be mechanically ground to render them very fine, as well as diatomaceous earth, which is rendered fine by natural processes. None of these and other fillers heretofore known are, however, sufficiently fine to impart long life to the records. Moreover, even those fillers which lend themselves to the finest mechanical grinding have been found to produce a substantial amount of surface noise when the records in which they are incorporated are played.

The primary object of my present invention is to provide an improved composition of matter which is suitable for phonograph records and which will be free from the aforementioned and other defects present in prior art records.

More specifically, it is an object of my present invention to provide an improved molding compound from which may be made phonograph records having improved surface noise characteristics and greater life, or wear resistance, than records previously made.

Another object of my present invention is to provide, for phonograph record materials, an improved filler of so fine a texture as to enable control of the consistency of the material over a very wide range and still impart to the records a minimum of surface noise over the entire range.

It is a further object of my present invention to provide an improved resinous composition for phonograph records which will be economical in cost and in manufacture, which readily lends itself to processing, such as working, pressing and blanking, and which produces a record having excellent characteristics from the standpoints of long life and fidelity of reproduction.

In accordance with my present invention, I incorporate into the resinous molding compound a chemically formed filler, suitable plasticizers, mold lubricants and dyes or pigments, as may be required, the chemical process employed in forming the filler being such as to result in an extremely fine material without the necessity of mechanically grinding the same. One filler which I have found particularly suitable is chromic oxide ($Cr_2O_3$). This material not only can be formed in extremely small particle size, which accounts for the great reduction in surface noise in the finished record, but is also extremely hard, and it is its extreme hardness which accounts for the long record life.

The chromic oxide may be made by reducing potassium dichromate with a suitable reducing agent in a furnace at a temperature of about 1500° F. After the reduction is complete, the material is removed from the furnace, allowed to cool, and finally leached in warm water. The water removes all soluble salts, allowing the green oxide of chromium to remain in the bottom of the tank. This material is then dried and run through a disintegrator which breaks up all small agglomerates, giving as a final product an extremely fine chromic oxide powder, the particle size of which is such that the greatest diameter thereof is of the order of 0.3 micron.

Another way of forming the chromic oxide filler is to reduce potassium dichromate with an alcohol such as ethyl alcohol, for example, in the presence of sulphuric acid and adding an alkali, such as sodium or potassium hydroxide, to the resulting product to precipitate out chromic hydroxide. After washing the chromic hydroxide to remove any soluble salts, it is heated to drive off water, and again extremely fine green chromic oxide results.

Any suitable resin may be employed as a base for the record material, such as shellac, phenolic resins, vinyl resins, resins derived from acrylic acid and its derivatives, urea resins, etc., as may other compositions which become plastic under the action of heat, either with or without pressure, such as cellulose acetate and cellulose nitrate. Within recent years, the value of certain vinyl resins, such as vinyl chloride and vinyl acetate, or mixtures thereof, has been recognized for use as phonograph record materials. I have found that a filler formed according to my present invention greatly enhances this value, as it imparts to these resins great wear resistance without in any way deleteriously affecting their other qualities which render them valuable in the phonograph record industry. Examples of typical formulae representing the limits within which my improved filler may be varied and still provide excellent results are as follows:

Formula I

| | Parts by weight |
|---|---|
| Vinyl resin | 90 |
| Chromic oxide | 7½ |
| Carbon black | 50 |
| Calcium stearate | 1 |
| Carnauba wax | 1½ |
| Chlorinated naphthalene | 4½ |

*Formula II*

| | Parts by weight |
|---|---|
| Vinyl resin | 90 |
| Chromic oxide | 150 |
| Carbon black | 5 |
| Calcium stearate | 1 |
| Carnauba wax | 1½ |
| Chlorinated naphthalene | 4½ |

Materials having the above and other similar formulae may be readily compounded on rolls, as used in the production of rubber compounds, for example, or they may be made in a Banbury mixer. It will be noted that in Formula I the chromic oxide constitutes about 5%, by weight, of all the materials present, whereas in Formula II, the chromic oxide present is about 60%. I have found that as little as 3% of chromic oxide will produce markedly improved results and that excellent results are obtained from a composition containing about 33% of the chromic oxide filler. Such a composition will be similar to that of Formula II, but will have only about 45 parts, by weight, of chromic oxide.

It is to be understood that the foregoing formulae are merely illustrative and not limiting as to the particular ingredients employed. Not only can the resin base be varied, but also the specific plasticizers and mold lubricants. Also, in place of chromic oxide, it is possible to use titanium oxide, aluminum oxide, molybdenum oxide, or any other metal oxide which may be chemically formed, as by precipitation, so as to be extremely fine, and which is relatively hard, so as to impart wear resistance to the finished record. Where a vinyl resin is employed as the base, care must be taken not to use the oxides of iron, zinc or the like which attack the resin. If desired, additional fillers, such as blanc fixe (barium sulphate) may be employed in addition to the chromic oxide in order to make the final product less expensive, and since the blanc fixe may be precipitated chemically and therefore made extremely fine, its use along with the chromic oxide filler will not increase the surface noise.

From the foregoing description, it will be apparent to those skilled in the art that I have provided an improved composition for phonograph records which has the advantages heretofore noted. In addition to these advantages, I have also found that records made of this material have much less tendency to acquire and retain static charges of electricity than materials heretofore known and they therefore do not readily attract dust particles which normally help to shorten record life and to increase surface noise. I have also found that phonograph records made according to my present invention suffer very little warping, even under extreme conditions. These advantages can also be realized by many modifications which will, no doubt, readily suggest themselves to those skilled in the art and which fall within the scope of the present invention. I therefore desire that my invention shall not be limited except insofar as is made necessary by the prior art and by the spirit of the appended claims.

I claim as my invention:

1. A phonograph record comprising a moldable plastic material having as a constituent a filler of chromic oxide the particle size of which is of the order of 0.3 micron.

2. A phonograph record comprising a moldable plastic material and including as an ingredient thereof a filler of chromic oxide of extremely fine particle size, said particles having been rendered fine through chemical action.

3. A phonograph record comprised of a plastic material having a resin base and including as an ingredient thereof a filler of chromic oxide of extremely fine particle size, said particles having been rendered fine through chemical action.

4. A phonograph record comprised of a material having as essential ingredients a vinyl resin base and a filler of chromic oxide of extremely fine particle size, said particles having been rendered fine through chemical action.

5. A phonograph record comprised of a material having a vinyl resin base and a filler of chromic oxide having a particle size of the order of 0.3 micron.

6. A phonograph record comprised of a material having a vinyl resin base and a plurality of metal oxide fillers, at least one of said fillers being extremely fine chromic oxide rendered fine solely by chemical action and at least one other of said fillers comprising a metal oxide which does not attack said vinyl resin.

7. A phonograph record comprised of a material having a vinyl resin base and including a filler of extremely fine particles of chromic oxide, the chromic oxide content being not less than 3%, by weight, of the total material.

8. A phonograph record comprised of a material having a vinyl resin base and including a filler of extremely fine particles of chromic oxide, the chromic oxide content being not more than 60%, by weight, of the total material.

9. A phonograph record comprised of a material having a vinyl resin base and including a filler of extremely fine particles of chromic oxide, the chromic oxide content being not less than 3% nor more than 60%, by weight, of the total material.

10. A phonograph record comprised of a material having a vinyl resin base and including a filler of extremely fine particles of chromic oxide, the chromic oxide content being approximately 33%, by weight, of the total material present.

11. A phonograph record according to claim 10 characterized in that the chromic oxide has a particle size of the order of 0.3 micron.

12. A phonograph record comprised of a material having a vinyl resin base and including at least two fillers chemically prepared in extremely small particle size, at least one of said two fillers comprising chromic oxide.

13. A phonograph record comprised of a material having a vinyl resin base and including at least two fillers chemically prepared in extremely small particle size, one of said fillers comprising chromic oxide and the other of said fillers comprising blanc fixe.

JAMES H. HUNTER.